US000001515H

United States Statutory Invention Registration [19]

[11] Reg. Number: H1515

Hattori et al.

[45] Published: Jan. 2, 1996

[54] SILVER HALIDE PHOTOGRAPHIC MATERIAL

[75] Inventors: Yasushi Hattori; Yoshiharu Yabuki, both of Kanagawa, Japan

[73] Assignee: Fuji Photo Film Co., Ltd., Minami-ashigara, Japan

[21] Appl. No.: 113,755

[22] Filed: Aug. 31, 1993

[30] Foreign Application Priority Data

Sep. 3, 1992 [JP] Japan ..... 4-258835

[51] Int. Cl.[6] ..... G03C 1/06

[52] U.S. Cl. ..... 430/522

[58] Field of Search ..... 430/522

[56] References Cited

U.S. PATENT DOCUMENTS

| | | | |
|---|---|---|---|
| 4,294,916 | 10/1981 | Postle et al. | 430/522 |
| 4,294,917 | 10/1981 | Postle et al. | 430/522 |
| 4,920,031 | 4/1990 | Ohno et al. | 430/522 |
| 4,935,337 | 6/1990 | Kuwashima et al. | 430/522 |
| 5,075,205 | 12/1991 | Inagaki et al. | 430/522 |
| 5,098,818 | 3/1992 | Ito et al. | 430/434 |
| 5,124,242 | 6/1992 | Hattori et al. | 430/510 |

*Primary Examiner*—Donald P. Walsh
*Assistant Examiner*—Chrisman D. Carroll
*Attorney, Agent, or Firm*—Sughrue, Mion, Zinn, Macpeak & Seas

[57] ABSTRACT

A silver halide photographic material is disclosed, which comprises a transparent support having thereon a dye layer, a hydrophobic polymer layer and at least one light-sensitive silver halide emulsion layer, wherein the dye layer containing one or more specified dyes dispersed in the form of fine solid particles is provided between the light-sensitive silver halide emulsion layer and the support, the hydrophilic colloid coating weight of the dye layer is 0.5 g/m$^2$ or less, and a hydrophobic polymer layer is provided between the dye layer and the support.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC MATERIAL

FIELD OF THE INVENTION

This invention relates to a silver halide photographic material, and more particularly to a silver halide photographic material which is well adapted for rapid processing, and which provides an image of high quality and has high sensitivity.

BACKGROUND OF THE INVENTION

Conventional methods for exposure of photographic materials to light include an image forming method using a scanner system. Therein, the original is scanned, and a silver halide photographic material is exposed to light based on the resulting image signals to form a negative image or a positive image corresponding to that of the original. Many recording devices which practically use such a scanner system type image forming method are conventionally known. Light sources which are conventionally used for the recording of the scanner system type recording devices include glow lamps, xenon lamps, mercury vapor lamps, tungsten lamps and light-emitting diodes. However, these light sources are disadvantageous in that their output is low and their working life is short. Scanners and laser printers are known where exposure to light is conducted under high illumination conditions using coherent laser beams such as He-Ne laser beams, argon laser beams and He-Cd laser beams as light sources for the scanner system to remedy the above-described disadvantages. However, although providing a high output, these scanners and laser printers are disadvantageous in that the devices are large-sized and expensive and a modulator is required. Additionally, because the illumination source for exposure emits visible light, there is a limit to safelight use for the photographic materials, and handleability is also poor.

On the other hand, semiconductor lasers are small-sized and inexpensive, modulation is easily conducted, and semiconductor lasers have a working life which is longer than that of the foregoing lasers. In addition, a safelight is advantageously used with semiconductor lasers which emit light in the infrared region. Thus, handleability and workability are improved.

Dyes which absorb light in the infrared region are generally used to prevent halation, to thereby reduce blurring of the image due to exposure to infrared light. Practically, the dyes can remain in the photographic material after processing, so long as the dyes do not absorb visible light. However, the dyes usually absorb some visible light, and a residual color is formed when the dyes remain in the photographic material after processing. The formation of the residual color is practically not preferred. Accordingly, water-soluble dyes are used as the antihalation dyes.

When water-soluble dyes are used in layers on the same side of the support as that coated with silver halide emulsions, the dyes diffuse into the silver halide emulsion layers. Consequently, sensitivity is greatly lowered.

To solve this problem, a method has recently been proposed wherein dyes which are decolorizable in the development processing stage are dispersed in the form of fine solid particles to fix the dyes to a specific layer [See, (PCT)WO 88/04794, European Patent (Laid-Open) Nos. 0,274,723A1, 276,566 and 299,435, JP-A- 52-92716 (the term "JP-A" as used herein means an "unexamined published Japanese patent application"), JP-A- 55-155350, JP-A-55-155351, JP-A-61-205934, JP-A-48- 68623, U.S. Pat. Nos. 2,527,583, 3,486,897, 3,746,539, 3,933,798, 4,130,429 and 4,040,841, Japanese Patent Application No. 1-50874, JP-A-2-282244, JP-A-3-167546 and JP-A-4-180057].

However, dyes which absorb light in the visible wavelength region are mainly disclosed in the above patent specifications. Even where dyes which absorb light in the infrared region are disclosed, it has been found that the dyes specifically exemplified therein are not sufficiently fixed to a specific layer.

SUMMARY OF THE INVENTION

An object of the present invention is to provide a silver halide photographic material having high sensitivity and providing high image quality, and which photographic material is well adapted for rapid processing.

The above-described object of the present invention has been achieved by providing a silver halide photographic material comprising a transparent support having thereon a dye layer, a hydrophobic polymer layer and at least one light-sensitive silver halide emulsion layer, wherein the dye layer contains at least one dye represented by formulae (I) to (VIII) dispersed in the form of fine solid particles, the dye layer is disposed between the at least one light-sensitive silver halide emulsion layer and the support, the hydrophilic colloid coating weight of the dye layer is 0.5 g/m$^2$ or less, and the hydrophobic polymer layer is disposed between the dye layer and the support:

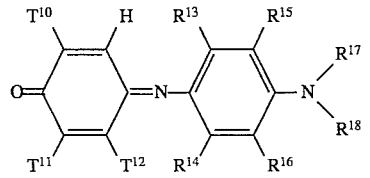

(I)

wherein $T^{10}$, $T^{11}$ and $T^{12}$ independently represent a hydrogen atom, a halogen atom, a cyano group, a nitro group, a carboxyl group, an alkyl group, an aryl group, an alkoxy group, an aryloxy group, an alkylthio group, an arylthio group, an alkylsulfonyl group, an arylsulfonyl group, a sulfamoyl group, a carbamoyl group, an amino group, a sulfonamido group, a carbonamido group, a ureido group, a sulfamido group, a hydroxy group, a vinyl group or an acyl group; $R^{13}$ and $R^{14}$ independently represent a hydrogen atom, a halogen atom, an alkoxy group, an alkyl group, an alkenyl group, an aryloxy group or an aryl group; $R^{15}$ and $R^{16}$ independently represent a hydrogen atom or a substituent group; and $R^{17}$ and $R^{18}$ independently represent an alkyl group, an aryl group, a vinyl group, an acyl group, an alkyl group or an arylsulfonyl group; or $T^{11}$ and $T^{12}$, $R^{13}$ and $R^{15}$, $R^{14}$ and $R^{16}$ $R^{17}$ and $R^{18}$ $R^{15}$ and $R^{17}$ $R^{16}$ and $R^{18}$ may be combined together to form a ring;

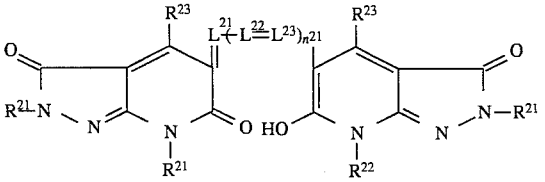

(II)

wherein $R^{21}$ represents a hydrogen atom, an alkyl group, an aryl or a heterocyclic group; $R^{22}$ represents a hydrogen atom, an alkyl group, an aryl group, a heterocyclic group, $COR^{24}$ or $SO_2R^{24}$; $R^{23}$ represents a hydrogen atom, a cyano group, a hydroxyl group, a carboxyl group, an alkyl group, an aryl group, $COOR^{24}$, $OR^{24}$, $NR^{25}R^{26}$, $CONR^{25}R^{26}$, $NR^{25}COR^{24}$, $NR^{25}SO_2R^{24}$ or $NR^{25}CONR^{25}R^{26}$; $R^{24}$ represents an alkyl group or an aryl group; $R^{25}$ and $R^{26}$ each represents a hydrogen atom, an alkyl group or an aryl group; $L^{21}$, $L^{22}$ and $L^{23}$ each represents a methine group; and $n^{21}$ represents 1 or 2;

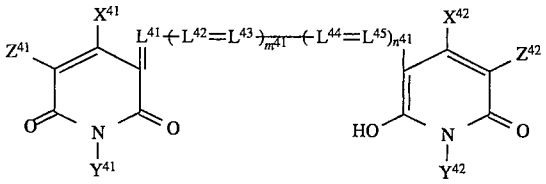

(III)

wherein $X^{41}$ and $X^{42}$ each represents a hydrogen atom, a hydroxyl group, a carboxyl group, —$COOR^{41}$, —$COR^{41}$, —$CONH_2$, —$CONR^{41}R42^{42}$, an alkyl group, an aryl group or a heterocyclic group; $Y^{41}$ and $Y^{42}$ each represents a hydrogen atom, an alkyl group, an aryl group or a heterocyclic group; $Z^{41}$ and $Z^{42}$ each represents a hydrogen atom, —CN, a carboxyl group, —$COOR^{43}$, —$COR^{43}$, —$CONH_2$, —$CONR^{43}R^{44}$, —$NHCOR^{43}$, —$NHSO_2R^{43}$, —$SO_2R^{43}$, an alkyl group, an aryl group or a heterocyclic group; $R^{41}$ and $R^{43}$ each represents an alkyl group or an aryl group; $R^{42}$ and $R^{44}$ each represents a hydrogen atom, an alkyl group or an aryl group; $L^{41}$, $L^{42}$, $L^{43}$, $L^{44}$ and $L^{45}$ each represents a methine group; and $m^{41}$ and $n^{41}$ each represents an integer and the sum of $m^{41}$ and $n^{41}$ is 2;

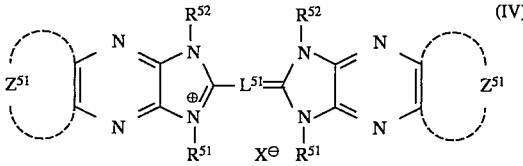

(IV)

wherein $R^{51}$ and $R^{52}$ each represents an alkyl group, an alkenyl group or an aryl group; $L^{51}$ represents a bonding group formed by bonding five or seven methine groups through conjugated double bonds; $Z^{51}$ represents an atomic group required for completing an aromatic ring; and $X^{\ominus}$ represents an anion;

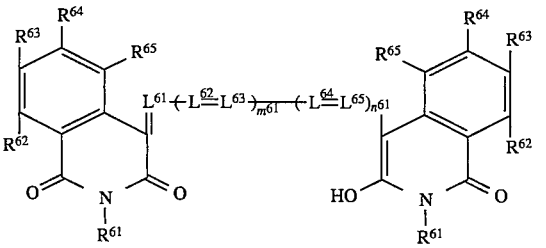

(V)

wherein $R^{61}$ represents a hydrogen atom, an alkyl group or an aryl group; $R^{62}$, $R^{63}$, $R^{64}$ and $R^{65}$ each represents a hydrogen atom, an alkyl group, a halogen atom, an alkoxy group, an alkoxycarbonyl group, a carboxyl group, a hydroxyl group or an amino group; $L^{61}$, $L^{62}$, $L^{63}$, $L^{64}$ and $L^{65}$ each represents a methine group; and $m^{61}$ and $n^{61}$ each represents an integer and the sum of $m^{61}$ and $n^{61}$ is 2;

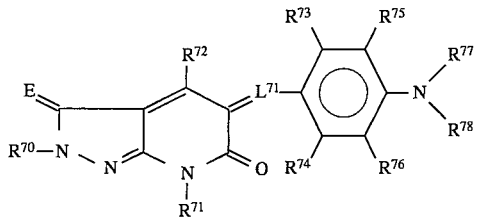

(VI)

wherein $L^{71}$ represents nitrogen atom or a group formed by bonding five or seven unsubstituted or substituted methine groups through conjugated double bonds; E represents O, S or N—$R^{79}$; $R^{70}$ and $R^{79}$ independently represent a hydrogen atom, an alkyl group, an alkenyl group, an alkynyl group, an aryl group, a heterocyclic group, an amino group, a hydrazino group or a diazenyl group; $R^{71}$ represents a hydrogen atom, an alkyl group, an aryl group, an alkenyl group, an alkynyl group or a heterocyclic group; $R^{72}$ represents a hydrogen atom, a halogen atom, a cyano group, a nitro group, a hydroxyl group, a carboxyl group, an alkyl group, an aryl group, an alkenyl group, a heterocyclic group, an alkoxy group, an aryloxy group, an alkoxycarbonyl group, an aryloxycarbonyl group, an amino group, an acyloxy group, a carbamoyl group, a sulfamoyl group, a alkylthio group, an arylthio group, an alkylsulfonyl group, an arylsulfonyl group or an alkynyl group; $R^{70}$ and $R^{79}$ may be combined together to form a ring; $R^{73}$ and $R^{74}$ independently represent a hydrogen atom, a halogen atom, an alkoxy group, an alkyl group, an alkenyl group, an aryloxy group or an aryl group; $R^{75}$ and $R^{76}$ independently represent a hydrogen atom or a substituent group; and $R^{77}$ and $R^{78}$ independently represent an alkyl group, an aryl group, a vinyl group, an acyl group or an alkyl- or arylsulfonyl group; or $R^{73}$ and $R^{75}$, $R^{74}$ and $R^{76}$, $R^{77}$ and $R^{78}$, $R^{75}$ and $R^{77}$ or $R^{76}$ and $R^{78}$ may be combined together to form a ring;

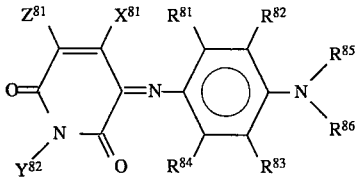

(VII)

wherein $X^{81}$ represents a hydrogen atom, a hydroxyl group, $COOR^{87}$, $CONR^{87}R^{88}$, an alkyl group or an aryl group; $Y^{82}$ represents a hydrogen atom, an alkyl group, an aryl group, a heterocyclic group or $NR^{87}R^{88}$; $Z^{81}$ represents a hydrogen atom, an alkyl group, an aryl group, a cyano group, $COOR^{89}$, $CONR^{87}R^{88}$, $COR^{89}$, $SO_2R^{89}$, $NR^{88}COR^{89}$, a nitro group or a pyridyl group; $R^{81}$, $R^{82}$, $R^{83}$ and $R^{84}$ each represents a hydrogen atom, an alkyl group, $OR^{89}$, $NR^{89}COR^{87}$, $COOR^{89}$, $CONR^{87}R^{88}$ or a halogen atom; $R^{85}$ and $R^{86}$ each represents a hydrogen atom, an alkyl group, an aryl group or a heterocyclic group; and $R^{87}$, $R^{88}$ and $R^{89}$ each represents a hydrogen atom, an alkyl group, an aryl group or a heterocyclic group; or $R^{81}$ and $R^{82}$, $R^{85}$ and $R^{86}$, $R^{82}$ and $R^{85}$, $R^{83}$ and $R^{86}$, or $R^{87}$ and R88 may be combined together to form a five-membered or six-membered ring;

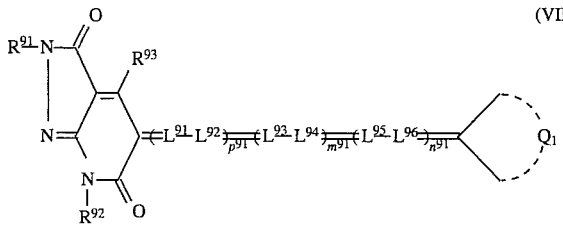

(VIII)

wherein $R^{91}$, $R^{92}$ and $R^{93}$ each represents a hydrogen atom an alkyl group or an aryl group; $Q_1$ represents an atomic group required for forming a basic heterocyclic ring; $L^{91}$, $L^{92}$, $L^{93}$, $L^{94}$, $L^{95}$ and $L^{96}$ each represents a methine group; $p^{91}$, $m^{91}$ and $n^{91}$ each represents 0 or 1 provided that the sum total of $p^{91}+m^{91}+n^{91}$ is an integer of 2 or more; and the compound of formula (VIII) has at least one member selected from the group consisting of a carboxyl group, a sulfonic acid arylamido group and a phenolic hydroxyl group contained in the molecular structure thereof.

DETAILED DESCRIPTION OF THE INVENTION

The present invention is illustrated in greater detail below.

In formula (I), examples of a substituent group for $R^{15}$ and $R^{16}$ include a hydrogen atom, an alkyl group, an alkoxy group and a halogen atom.

In formula (VI), examples of a substituent group for $R^{75}$ and $R^{76}$ include an hydrogen atom, an alkyl group, an alkoxy group and a halogen atom.

In formulae (I) to (VIII), an alkyl group has preferably 1 to 8 carbon atoms and more preferably 1 to 4 carbon atoms. Examples of the alkyl group include methyl, ethyl, n-propyl, iso-propyl, n-butyl, tert-butyl, hexyl and octyl. Further, the alkyl group may be substituted. Examples of the substituents include an alkyl group, an aryl group, an alkoxy group, a halogen atom, a cyano group, a carboxyl group, a sulfonamido group, a sulfamoyl group, an acyl group, an alkoxycarbonyl group, an acylamino group, a carbamoyl group, a hydroxyl group and an alkylsulfonyl group.

In formulae (I) to (VIII), the aryl group is preferably a phenyl group or a naphthyl group and more preferably a phenyl group. The aryl group may be substituted. Examples of the substituents include the substituents for the alkyl group described above.

In formulae (I) to (VIII), the alkoxy group has preferably 1 to 8 carbon atoms and more preferably 1 to 4 carbon atoms. Examples of the alkoxy group include methoxy, ethoxy, n-propyloxy and n-butoxy. The alkoxy group may be substituted. Examples of the substituents include an alkyl group, an alkoxy group, an aryl group and a halogen atom.

In formulae (I) to (VIII), the aryloxy group is preferably a phenoxy group or a naphthoxy group and more preferably a phenoxy group. The aryloxy group may be substituted. Examples of substituents include the substituents for the alkyl group described above.

In formulae (I) to (VIII), examples of the heterocyclic group include a pyridyl group, a thienyl group, a furano group and an imidazolyl group.

In formulae (I) to (VIII), examples of the halogen atom include fluorine, chlorine, bromine and iodine. Among these, fluorine, chlorine and bromine are preferred.

In formulae (I) to (VIII), examples of $X^{\ominus}$ include $Cl^{\ominus}$, $Br^{\ominus}$, $CF_3SO_3^{\ominus}$, $ClO_4^{\ominus}$, $PF_6^{\ominus}$, $CH_3SO_3^{\ominus}$ and $CH_3CO_2^{\ominus}$.

Specific examples of preferred compounds capable of forming a fine solid particle dispersion, represented by formulae (I) to (VII), for use in the present invention include, but are not limited to, the following compounds.

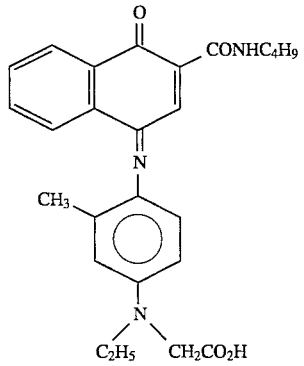

I-1

-continued
I-2
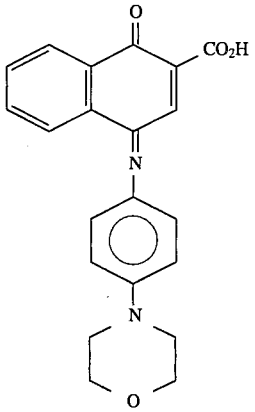
I-3
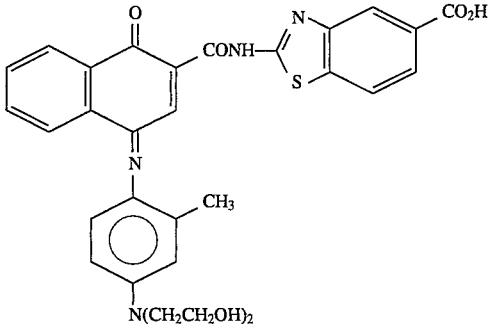
I-4
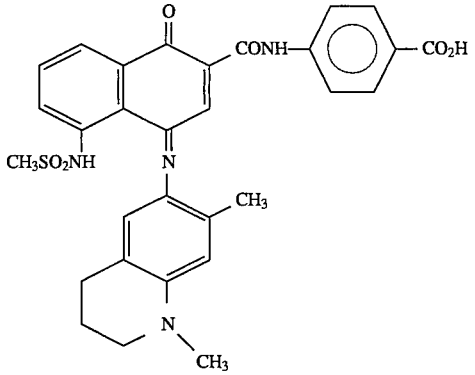
I-5
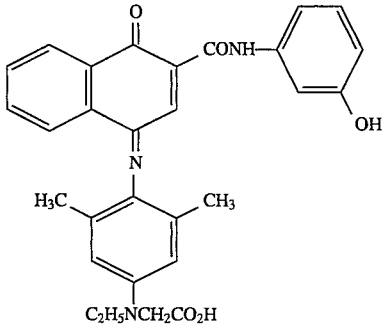

-continued
I-6
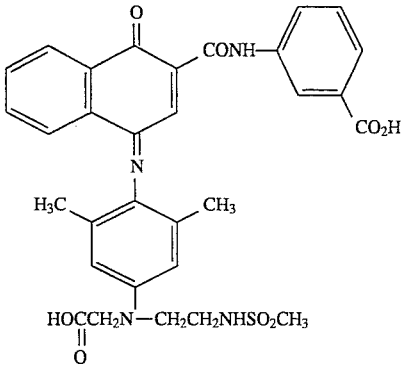
I-7
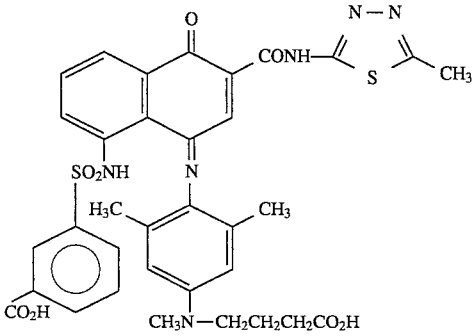
I-8
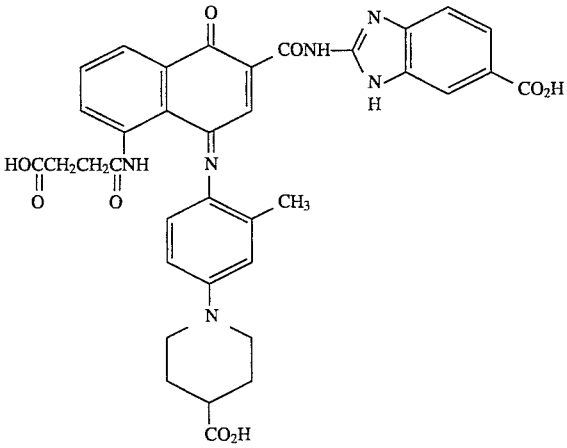
I-9
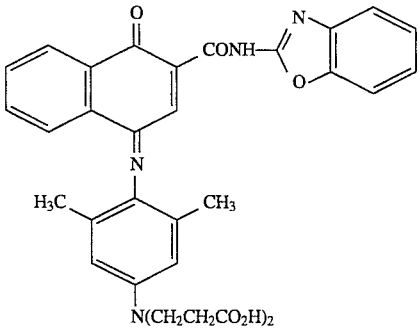

-continued
I-10
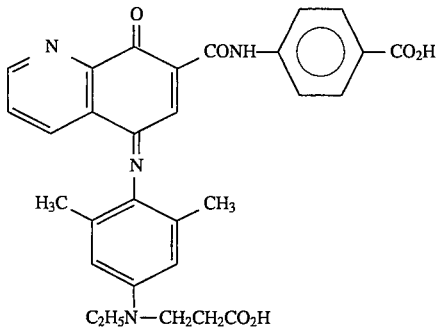
I-11
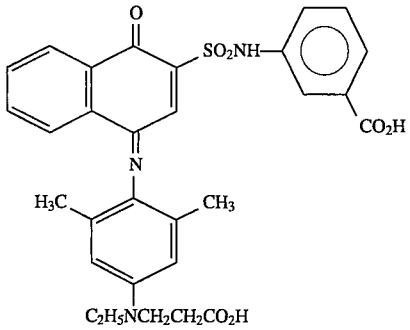
I-12
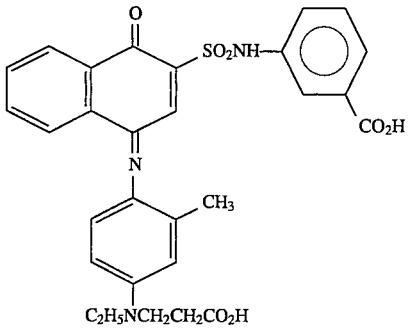
I-13
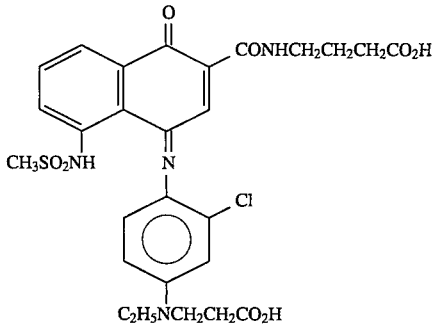
I-14
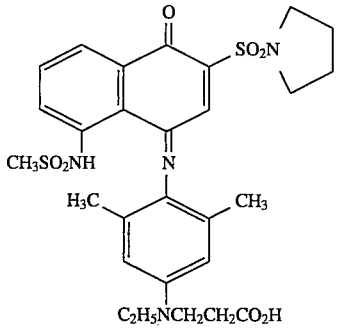

-continued
I-15
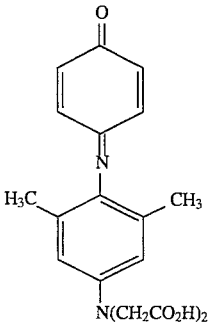
I-16
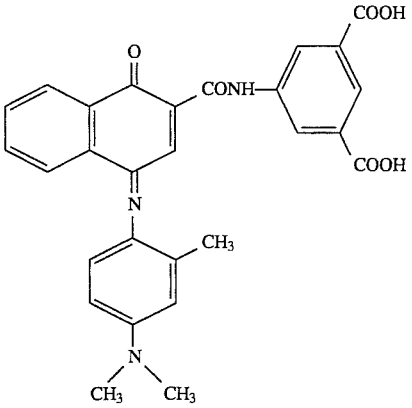
I-17
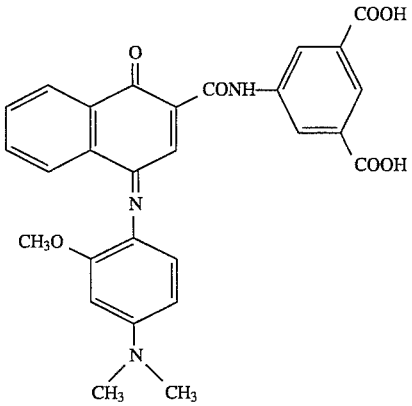
I-18
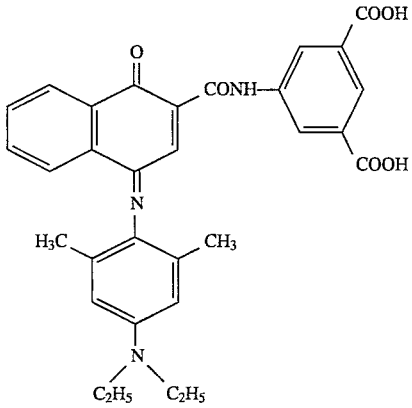

-continued
II-1
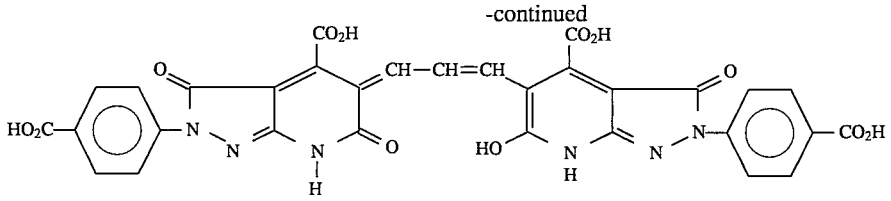
II-2
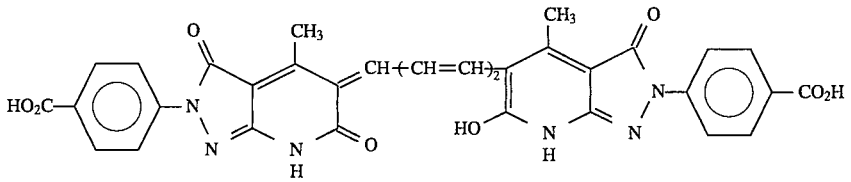
II-3
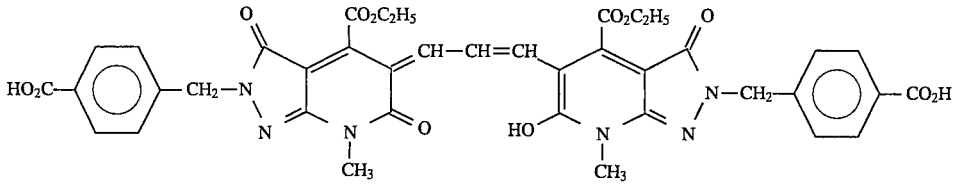
II-4
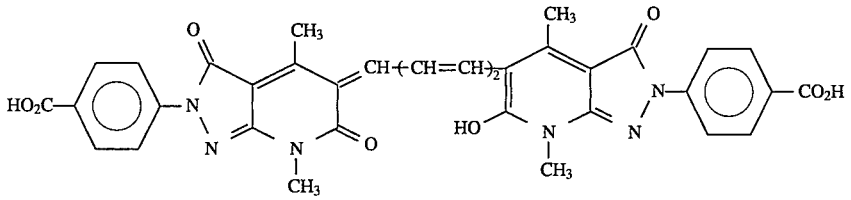
II-5
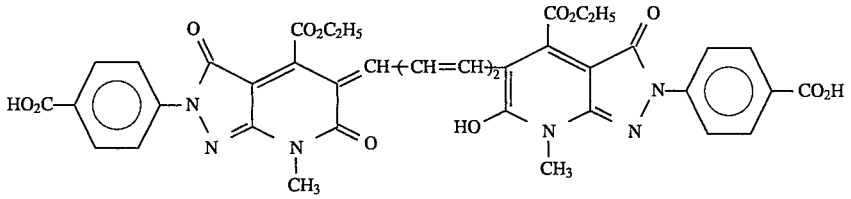
II-6
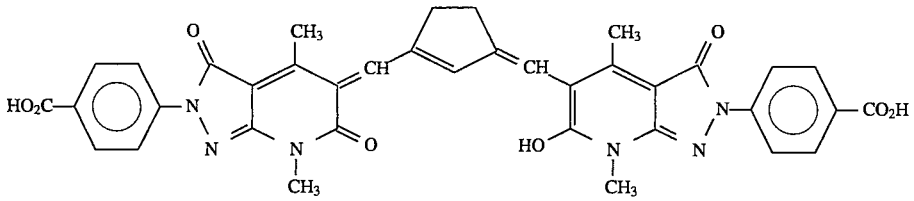
II-7
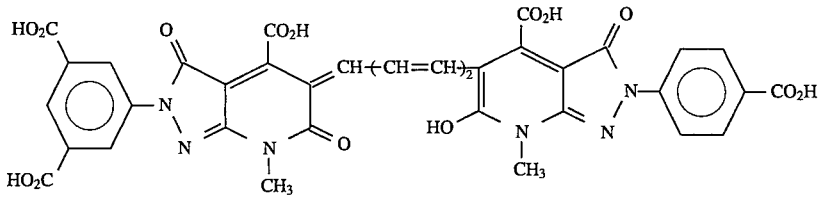
II-8
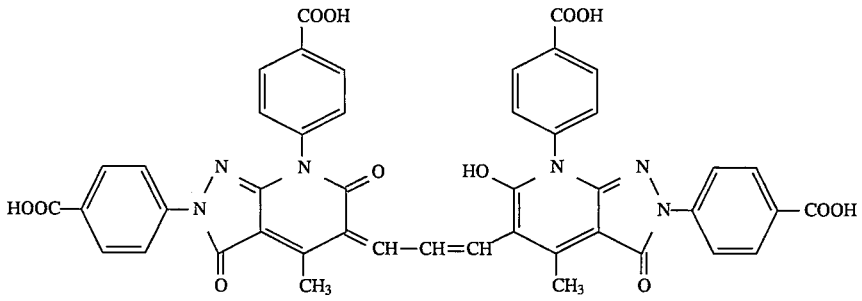

-continued
III-1
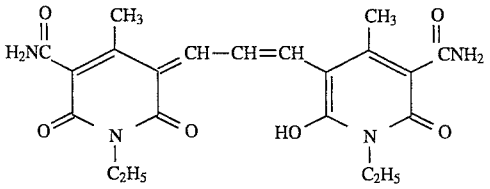
III-2
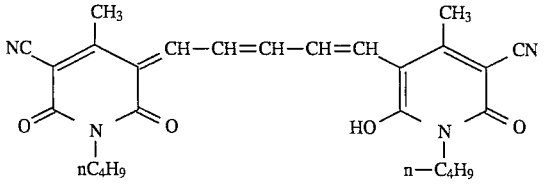
III-3
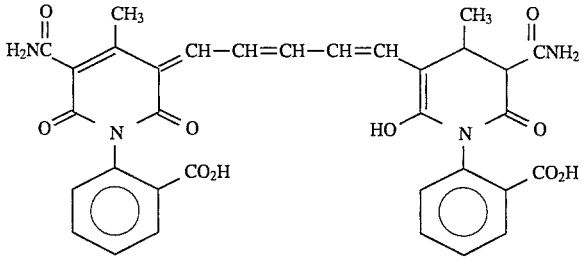
III-4
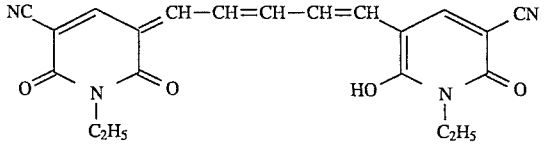
III-5
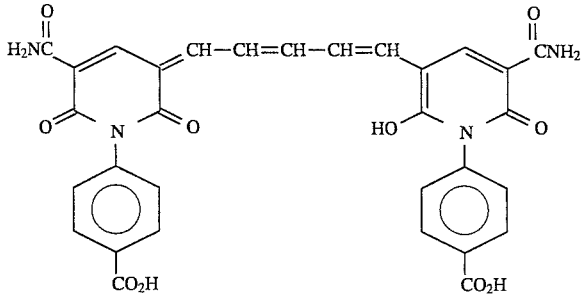
III-6
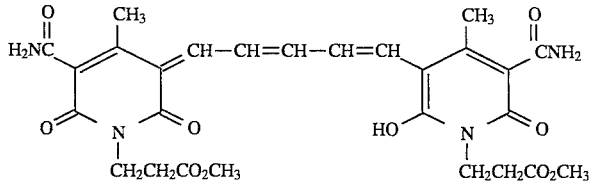
IV-1
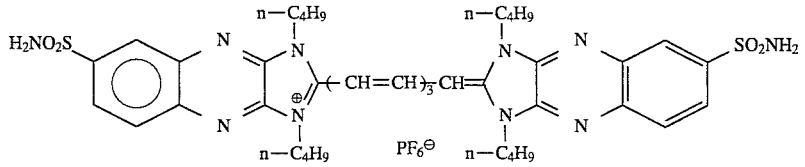
IV-2
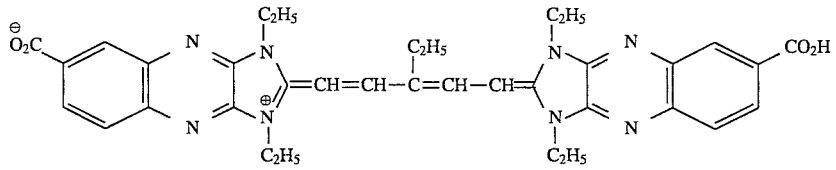

-continued
IV-3
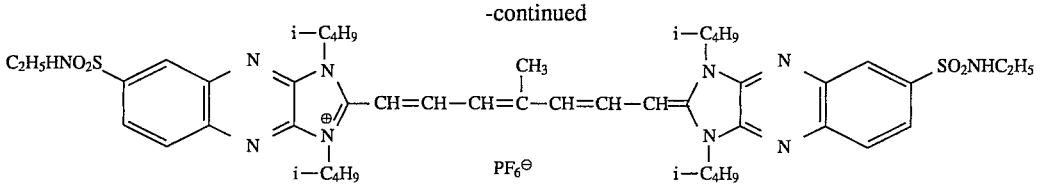
IV-4
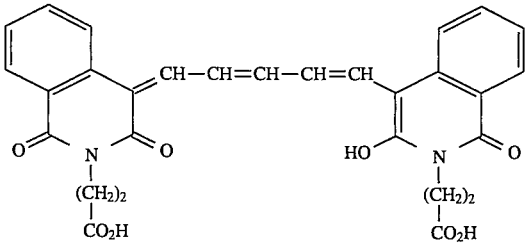
V-1
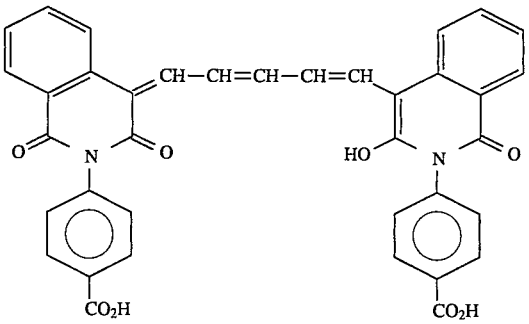
V-2
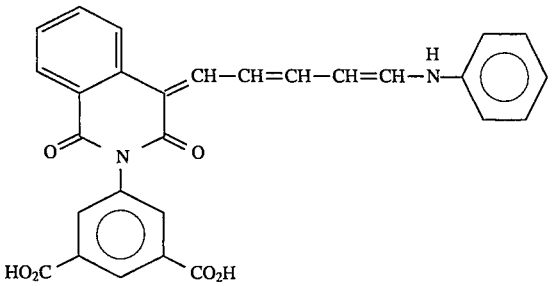
VI-1
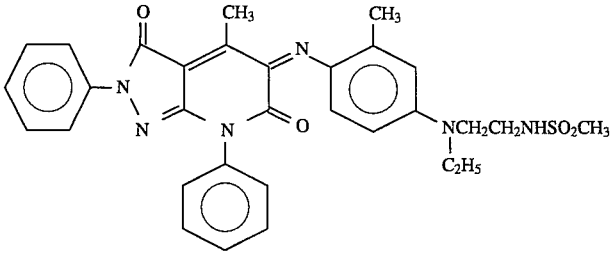
VI-2
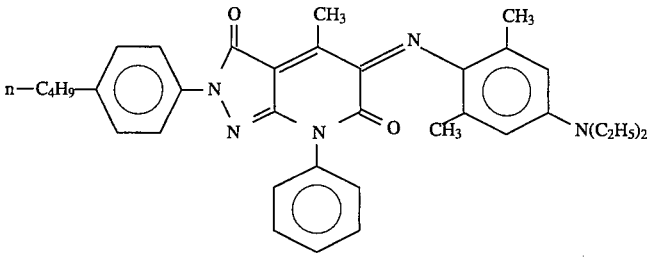

-continued
VI-3
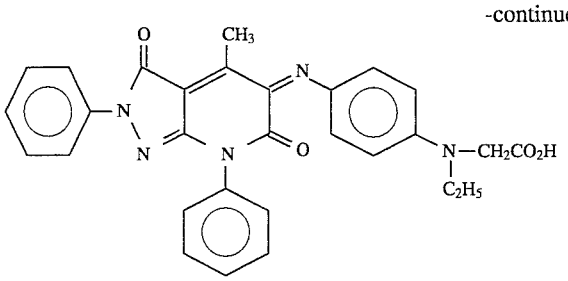
VI-4
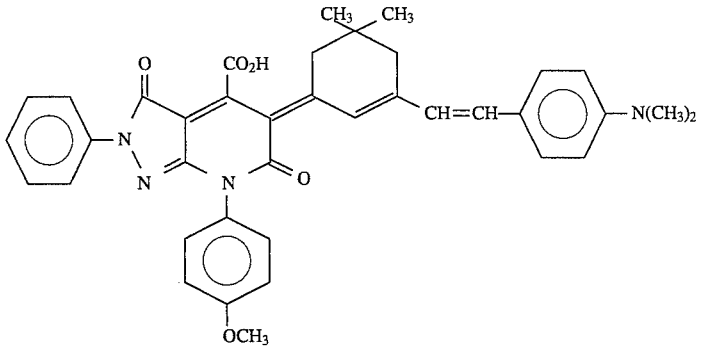
VI-5
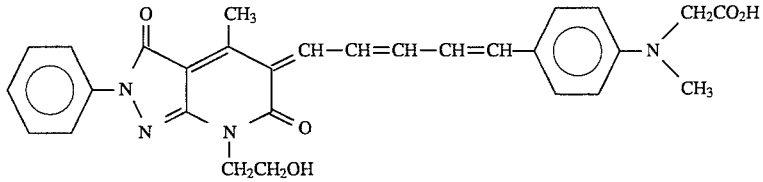
VII-1
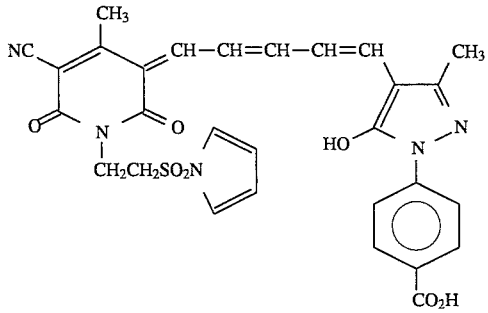
VII-2
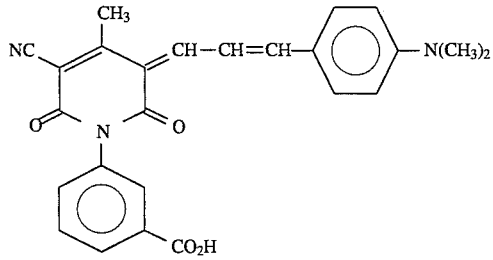

-continued

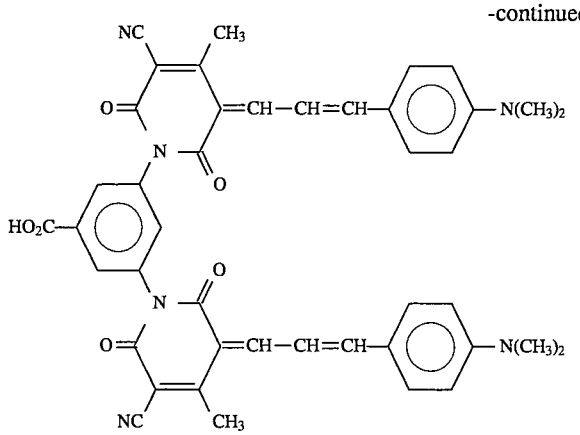

VII-3

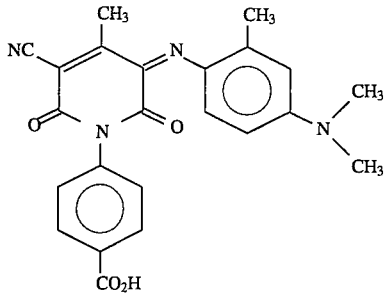

VII-4

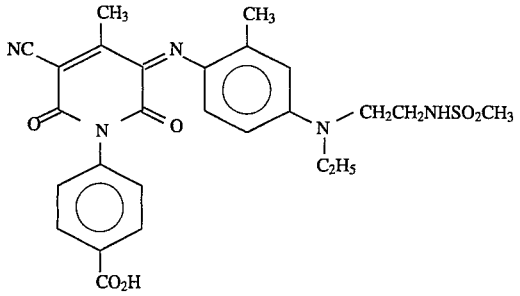

VII-5

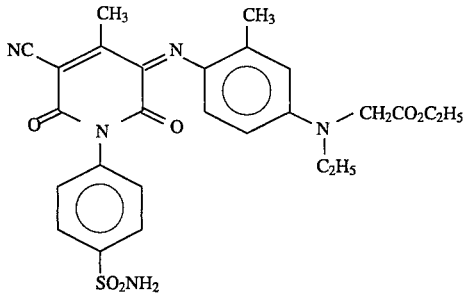

VII-6

The dyes for use in the present invention can be easily synthesized by the methods described in PCT-WO 88/04794, European Patent (Laid-Open) Nos. 0,274,723A1, 276,566 and 299,435, JP-A-52-92716, JP-A-55-155350, JP-A- 55-155351, JP-A-61-205934, JP-A-48-68623, JP-A-3-167546, JP-A-3-7931, JP-A-2-282244, and U.S. Pat. Nos. 2,527,583, 3,486,897, 3,746,539, 3,933,798, 4,130,429 and 4,040,841 and referring to these methods.

The term "dye dispersed in the form of fine solid particles" as used herein refers to a dye contained in a dye layer, which dye has poor solubility in the dye (colored) layer so that the dye can not be present therein in the molecular state, but is present as a solid having a (large) particle size so that the dye substantially does not diffuse within the dye layer.

Methods for preparing the fine solid particle dispersion are described in PCT-W088/04794, European Patent (Laid-Open) (EP) No. 0,276,566A1 and JP-A-63- 197943. Generally, the dye is crushed in a ball mill and stabilized by using a surfactant and gelatin.

In the present invention, the dispersion can be prepared according to the method described in JP-A-63- 197943.

Namely, 434 ml of water and a 6.7 wt % solution of 53 g of Triton X-200 surfactant ("TX-200" manufactured by Rohm & Haas Co.) are placed into a 1.5 l screw-cap bottle. To the bottle, there are added 20 g of the dye and 800 ml of zirconium oxide ($ZrO_2$) beads (2 mm diameter). The cap of the bottle is tightly closed. The bottle is placed in a mill, and the contents are crushed for 4 days.

The contents are added to 160 g of a 12.5 wt % aqueous solution of gelatin, and placed in a roll mill for 10 minutes to reduce bubbles. The resulting mixture is filtered to remove the $ZrO_2$ beads. The resulting solid as such is composed of fine particles having an average particle size of about 0.3 μm. Accordingly, the particles are classified by centrifugal separation into particles having a particle size of 1 μm or smaller.

The dye crystallites for use in the present invention have a particle size of preferably 1.0 μm or smaller, more preferably 0.5 μm or smaller and most preferably 0.01 to 0.5 μm.

The dyes are coated in an amount of preferably 5 to 300 mg/m$^2$, particularly preferably 10 to 150 mg/m$^2$.

The amount of gelatin used in preparation of the dispersion is that amount which provides a coating weight of gelatin (hydrophilic colloid) of 0.5 g/m$^2$ or less.

The gelatin (hydrophilic colloid) coating weight of the dye layer of the present invention is 0.5 g/m$^2$ or less, preferably 0.05 to 0.3 g/m$^2$.

When the coating weight of the entire hydrophilic colloid of the photographic material is increased, the amount of water absorbed by the photographic material during processing is increased and the load applied to the drying stage is increased. Hence, an increase in the coating weight of the entire hydrophilic colloid is not preferred from the standpoint of rapid processing. Accordingly, the total coating weight of hydrophilic colloid of the photographic material of the present invention is preferably not more than 3 g/m$^2$, more preferably 1 to 2.5 g/m$^2$ per each side of the support. To reduce the total coating weight of the hydrophilic colloid, the dye layer is preferably provided as a subbing layer. The subbing layer contains a hydrophilic colloid to improve adhesion between the support and another hydrophilic colloid layer such as a silver halide emulsion layer. Accordingly, when the dye layer serves as the subbing layer (e.g. the second subbing layer as described below), the dye layer can be provided without increasing the total amount of hydrophilic colloid.

When the coating weight of silver is increased, processing dependence of photographic properties is increased. Accordingly, an increase in the coating weight of silver is not preferred from the standpoint of rapid processing and a reduction in the replenishment rate, both of which have been in demand in recent years. The coating weight of silver is preferably 3 g/m$^2$ or less, more preferably 2 g/m$^2$ or less, particularly preferably 0.5 to 3 g/m$^2$.

Examples of the transparent support preferably used in the present invention include polyethylene terephthalate film and cellulose triacetate film.

The surface of the support is preferably subjected to a corona-discharging treatment, a glow-discharging treatment or an ultraviolet-irradiation treatment to improve the adhesion between the support and the hydrophilic colloid layer. A first subbing layer comprising, for example, a styrene butadiene latex or a vinylidene chloride latex (hydrophobic polymer layer) is disposed between the dye layer and the support.

Examples of hydrophobic polymers for use in the first subbing layer (hydrophobic polymer layer) include styrene-butadiene copolymers, vinylidene chloride copolymers, water-soluble polyesters and polyacrylic esters. Of these polymers, styrene-butadiene copolymers and vinylidene chloride copolymers are preferred. More preferred are the styrene-butadiene copolymers.

The styrene-butadiene copolymers may be copolymers of styrene and butadiene monomers in a weight ratio of from 9/1 to 1/9, and may optionally comprise a repeating unit derived from a third monomer such as acrylic acid.

The coating weight of the hydrophobic polymer in the first subbing layer is preferably 100 to 1,000 mg/m$^2$. The drying temperature of the subbing layer is preferably 80° to 200° C.

An aqueous dispersion (latex) of the hydrophobic polymer for use in the first subbing layer is preferably prepared as a coating solution, and further a crosslinking agent, a surfactant, a swelling agent, a matting agent, an antistatic agent, etc. are optionally added to the aqueous dispersion.

Examples of the crosslinking agent include the triazine compounds described in U.S. Pat. Nos. 3,325,287, 3,288,775 and 3,549,377 and Belgian Patent 6,602,226; the dialdehyde compounds described in U.S. Pat. Nos. 3,291,624 and 3,232,764, French Patent 1,543,694 and U.K. Patent 1,270,578; the epoxy compounds described in U.S. Pat. No. 3,091,537 and JP-B-49-26580 (the term "JP-B" as used herein means an "examined Japanese patent publication"); the vinyl compounds described in U.S. Pat. No. 3,642,486; the aziridine compounds described in U.S. Pat. No. 3,392,024; the ethyleneimine compounds described in U.S. Pat. No. 3,549,379; and methylol compounds. Of these compounds, dichlorotriazine compounds are preferred.

A hydrophilic colloid layer as a second subbing layer is preferably provided on the first subbing layer (hydrophobic polymer layer) in the present invention.

The coating weight of hydrophilic colloid in the second subbing layer is preferably 20 mg/m$^2$ to 0.4 g/m$^2$. The drying temperature of the second hydrophilic colloid layer is preferably 80° C. or more to effect good adhesion of the second layer to the first subbing layer. The drying temperature is 180° C. or lower. When the drying temperature is too high, the amount of the dye from the dye layer taken up by the first subbing layer is increased, and a residual color is formed. More preferably, the drying temperature is not higher than 160° C.

Preferably, a back layer as described in Japanese Patent Application No. 3-145168 is used to balance the drying property with repsect to curling.

That is, a light-insensitive hydrophilic colloid layer containing a hydrophilic colloid as a binder is provided on a second side of the support opposite the side having thereon at least one silver halide emulsion layer, and a hydrophobic polymer layer is provided on the second side of the support further away from the support than the light-insensitive hydrophilic colloid layer, and the light-insensitive hydrophilic colloid layer and the hydrophobic polymer layer are substantially not swollen when contacted with a processing solution (i.e., the thickness of their layers after the drying step is not more than 1.05 times that after completion of the water washing step in the development).

Various additives and methods described in the following patent specifications can be used to prepare the photographic material of the present invention without particular limitation. These additives and methods are described in the cited portions of the patent specifications as follows.

| Item | Patent Specification Citations |
|---|---|
| (1) Silver halide emulsion and preparation thereof | JP-A-2-68539 (the 6th line from the bottom of right lower column of page 8 to the 12th line of right upper column of page 10); JP-A-3-24537 (the 10th line of right lower column of page 2 to the first line of right upper column of page 6, and the 16th |

-continued

| Item | Patent Specification Citations |
|---|---|
| | line of left upper column of page 10 to the 19th line of left lower column of page 11); JP-A-4-107442; JP-A-2-97937 (the 12th line of right lower column of page 20 to the 14th line of left lower column of page 21); JP-A-2-12236 (the 19th line of right upper column of page 7 to the 12th line of left lower column of page 8); and JP-A-4-33043. |
| (2) Chemical sensitization method | JP-A-2-68539 (the 13th line of right upper column of page 10 to the 16th line of left upper column of page 10); Japanese Patent Application No. 3-105035; and selenium sensitization method described in Japanese Patent Application No. 3-189532. |
| (3) Anti-fogging agent, stabilizer | JP-A-2-68539 (the 17th line of left lower column of page 10 to the 7th line of left upper column of page 11, and the second line of left lower column of page 3 to left lower column of page 4);-JP-A-2-103526 (the 19th line of right lower column of page 17 to the 4th line of right upper column of page 18, and the first line to the 5th line of right lower column of page 18); and thio-sulfinic acid compounds described in JP-A-1-237538. |
| (4) Color tone improver | JP-A-62-276539 (the 7th line of left lower column of page 2 to the 20th line of left lower column of page 10); and JP-A-3-94249 (the 15th line of left lower column of page 6 to the 19th line of right upper column of page 11). |
| (5) Spectral sensitizing dye | JP-B-46-10473 (the 18th line of right column of page 1 to the 24th line of left column of page 2, and the 23rd line of right column of page 2 to the 22nd line of left column of page 6); U.S. Patent 3,482,973 (the 22nd line of the second column to the 59th line of the 4th column); U.S. Patent 3,623,881 (the 34th line of the second column of the 53rd line of the 7th column); JP-A-59-191032 (the 8th line of right of right upper column of page 3 to the 9th line of left lower column of page 3, and the 12th line of right lower column of page 3 to the bottom of page 7); JP-A-60-80841 (the 18th line of right lower column of page 4 to the 6th line of right lower column of page 12); and JP-A-1-97947 (the first line of left upper column of page 4 to the 11th line of right upper column of page 4, and the 11th line of right lower column of page 4 to the 6th line of right upper column of page 8, and the 9th line of left lower column of page 10 to the second line of left lower column of page 11). |
| (6) Super-sensitizing dye | JP-A-59-192242 (the 19th line of left lower column of page 10 to the 15th lone of left lower column of page 12); and JP-A-60-80841 (the 10th line of right upper column of page 13 to the first line of left upper column of page 16). |
| (7) Surfactant, antistatic agent | JP-A-2-68539 (the 14th line of left upper column of page 11 to the 9th line of left upper column of page 12); JP-A-2-12236 (the 7th line of right upper column of page 9 to the 7th line of right lower column of page 9); and JP-A-2-18542 (the 13th line of left lower column of page 2 to the 18th line of right lower column of page 4). |
| (8) Matting agent, lubricant (i.e., sliding agent) plasticizer | JP-A-2-68539 (the 10th line of left upper column of page 12 to the 10th line of right upper column of page 12, and the 10th line of left lower column of page 14 to the first line of right lower column of page 14); and JP-A-2-103526 (the 15th line of left upper column of page 19 to the 15th line of right upper column of page 19). |
| (9) Hydrophilic colloid | JP-A-2-68539 (the 11th line of left lower column of page 12 to the 16th line of left lower column of page 12). |
| (10) Hardening agent | JP-A-2-68539 (the 17th line of left lower column of page 12 of the 6th line of right upper column of page 13); and JP-A-2-103526 (the 5th line to the 17th line of right upper column of page 18). |
| (11) Dye | JP-A-63-49752 (the 4th line of left lower column of page 18 to the second line of left upper column of page 19). |
| (12) Binder | JP-A-2-18542 (the first line to the 20th line of right lower column of page 3). |
| (13) Polyhydroxy-benzenes | JP-A-3-39948 (left upper column of page 11 to left lower column of page 12); EP 452,7-72A; and JP-A-2-55349 (the 9th line of left upper column of page 11 to the 17th line of right lower column of page 11). |
| (14) Polymer latex | JP-A-2-103526 (the 12th line to the 20th line of left lower column of page 18). |
| (15) Compound having an acid group | JP-A-2-103526 (the 6th line of right lower column of page 18 to the first line of left upper column of page 19); and JP-A-2-55349 (the 13th line of right lower column of page 8 to the 8th line of left upper column of page 11). |
| (16) Hydrazine nucleating agent | JP-A-2-12236 (the 19th line of right upper column of page 2 to the third line of right upper column of page 7); and compounds of formula (II) and compounds II-1 to II-54 described in JP-A-3-174143 (the first line of right lower column of page 20 to the 20th line of right upper column of page 27). |
| (17) Nucleation accelerator | Compounds of formulas (II-m) to (II-p) and compounds II-1 to II-22 described in JP-A-2-103536 (the 13th line of right upper column of page 9 to the 10th line of left upper column of page 16); and compounds described in JP-A-1-179939 |
| (18) Black pepper inhibitor | Compounds described in U.S. Patent 4,956,257 and JP-A-1-118832 |
| (19) Redox compound | Compounds of formula (I) (particu-larly compounds 1 to 50) described in JP-A-2-301743; compounds of formulas (R-1), (R-2) and (R-3) and compounds 1 to 75 described in JP-A-3-174143 (pages 3 to 20); and compounds described in Japanese Patent Application Nos. 3-69466 and 3-15648. |

-continued

| Item | Patent Specification Citations |
|---|---|
| (20) Monomethine compound | Compounds of formula (II) (particularly compounds II-1 to II-26) described in JP-A-2-287532 |
| (21) Layer structure | JP-A-3-198041 |
| (22) Processing method | JP-A-2-103037 (the 7th line of right upper column of page 16 to the 15th line of left lower column of page 19); JP-A-2-115837 (the 5th line of right lower column of page 3 to the 10th line of right upper column of page 6); and JP-A-2-55349 (the first line of right lower column of page 13 to the 10th line of left upper column of page 16 |

The present invention is now illustrated in greater detail by reference to the following Examples which, however, are not to be construed as limiting the invention in any way.

EXAMPLE 1

Preparation of Supports 1 to 8

A biaxially stretched blue-colored polyethylene terephthalate film of 175 μm in thickness was subjected to corona discharging treatment. The polyethylene terephthalate film contained 1,4-bis(2,6-diethylanilino) anthraquinone. The following hydrophobic polymer layer was then coated on the film in such amount as to provide the following coating weights. The coating was carried out using a wire bar coater. The coated film was dried at 175° C. for one minute.

Hydrophobic Polymer Layer

| | |
|---|---|
| Polymer (compound shown in Table 1 below) | 0.322 g/m$^2$ |
| Sodium Salt of 2,4-Dichloro-6-hydroxy-s-triazine | 8.4 mg/m$^2$ |

The latex solution contained 0.4% by weight of the following emulsifying dispersant (a) based on the amount, on a solid basis, of the latex.

Emulsifying Dispersant (a)

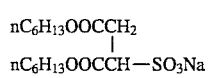

Subsequently, the following hydrophilic colloid layer was coated thereon in such amount as to provide the following coating weights. The coating was carried out using a wire bar coater. The coated film was dried at 150° C. for one minute.

Second Subbing Layer (Hydrophilic Colloid Layer)

| | |
|---|---|
| Gelatin | amount shown in Table 1 below |
| Polyethyl Acrylate | 20 mg/m$^2$ |
| $C_{12}H_{25}O(CH_2CH_2O)_{10}H$ | 4 mg/m$^2$ |

-continued

| | |
|---|---|
| 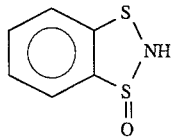 | 0.27 mg/m$^2$ |
| Dye | compound and amount shown in Table 1 below |

Preparation of Silver Halide Emulsion

To the following solution 1 kept at 38° C. and a pH of 4.5 with stirring, there were simultaneouly added the following solutions 2-a and 2-b over a period of 16 minutes to form a core. Subsequently, the following solutions 3-a and 3-b were added thereto over a period of 16 minutes to form an intermediate phase. Further, the following solutions 4-a and 4-b were added thereto over a period of 5 minutes to form the outermost phase, and 0.15 g of potassium iodide was added thereto to thereby complete the formation of grains.

The resulting emulsion was washed with water by conventional flocculation method, and 30 g of gelatin was added thereto. The pH of the emulsion was adjusted to 5.2, and the pAg thereof was adjusted to 7.5. Subsequently, 1 mg of sodium thiosulfate and 1.5 mg of the following compound (a) were added thereto, and chemical sensitization was carried out so as to provide the maximum sensitivity.

| | |
|---|---|
| Solution 1 | |
| Water | one liter |
| Gelatin | 20 g |
| Sodium Chloride | 2 g |
| 1,3-Dimethylimidazolidine-2-thione | 20 mg |
| Sodium Benzenethiosulfonate | 6 mg |
| Solution 2-a | |
| Water | 300 ml |
| Silver Nitrate | 75 g |
| Solution 2-b | |
| Water | 300 ml |
| Sodium Chloride | 23 g |
| Potassium Bromide | 10 g |
| Potassium Hexachloroiridate (III) (0.001 wt %) | 15 ml |
| $K_3RhCl_6$ (0.001 wt %) | 0.67 ml |
| Solution 3-a | |
| Water | 300 ml |
| Silver nitrate | 75 g |
| Solution 3-b | |
| Water | 300 ml |
| Sodium Chloride | 23 g |
| Potassium Bromide | 10 g |
| Solution 4-a | |
| Water | 100 ml |
| Silver Nitrate | 25 g |
| Solution 4-b | |
| Water | 100 ml |
| Sodum Chloride | 7.6 g |
| Potassium Bromide | 3.3 g |
| $K_3RhCl_6$ (0.001 wt %) | 0.22 ml |
| Compound (a) | |

-continued

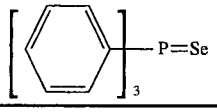

Further, 50 mg of 4-hydroxy-6-methyl-1,3,3a,7-tetrazaindene as a stabilizer and 100 ppm of phenoxyethanol as the antiseptic were added thereto to finally obtain a cubic silver iodochlorobromide emulsion having a silver chloride content of 80 mol% and a mean grain size of 0.20 μm (coefficient of variation: 9%).

Preparation of Coated Sample

Further, 100 mg of the following compound (b) as a spectral sensitizing dye and 100 mg of the following compound (c) as the supersensitizing agent were added to the emulsion, each amount being per mol of silver. Furthermore, 2.5 g of hydroquinone per mol of silver, 50 mg of 1-phenyl-5-mercaptotetrazole per mol of silver as anti-fogging agents, 0.4 g/m$^2$ of colloidal silica having a particle size of 10 μm, a polyethyl acrylate latex, as a plasticizer, in an amount of 25 wt % based on the amount of the gelatin binder and 2-bis(vinylsulfonylacetamido)ethane as the hardening agent were added thereto, and the resulting emulsion was coated on each of Supports 1 to 8 in an amount to provide a coating weight of 3.4 g/m$^2$ in terms of silver. The coating weight of gelation was 1.4 g/m$^2$.

The following lower and upper protective layers having the following compositions were simultaneously coated on the emulsion layer.

| | |
|---|---|
| Lower Protective Layer | |
| Gelatin | 0.25 g/m$^2$ |
| Dye (d) described below | 250 mg/m$^2$ |
| Sodium Benzenethiosulfonate | 2 mg/m$^2$ |
| 1,5-Dihydroxy-2-benzaldoxime | 25 mg/m$^2$ |
| 5-Chloro-8-hydroxyquinoline | 5 mg/m$^2$ |
| Polyethyl Acrylate Latex | 160 mg/m$^2$ |
| Upper Protective Layer | |
| Gelatin | 0.25 g/m$^2$ |
| Silica having an average particle size of 2.5 μm (matting agent) | 30 mg/m$^2$ |
| Silicon Oil | 100 mg/m$^2$ |
| Colloidal silica having a particle size of 10 μm | 30 mg/m$^2$ |
| Compound (e) described below | 5 mg/m$^2$ |
| Sodium Dodecylbenzenesulfonate | 22 mg/m$^2$ |
| Dye (d) | |

Compound (b)

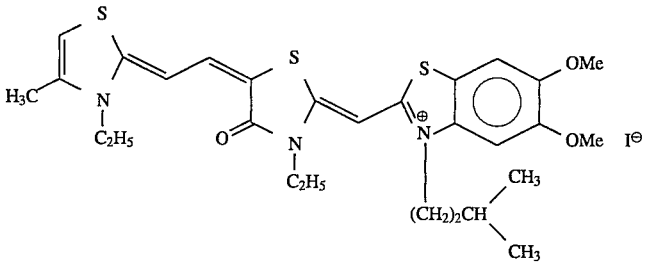

Compound (c)

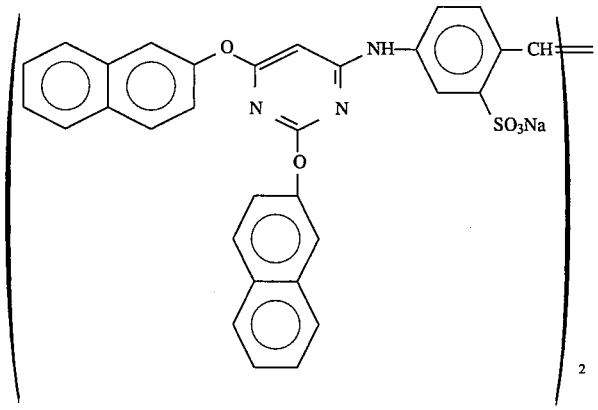

-continued

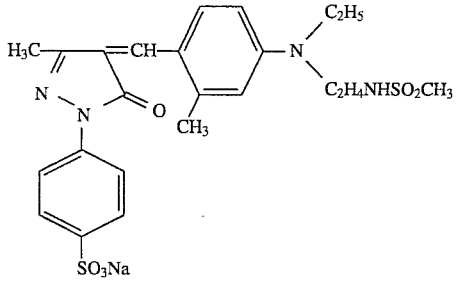

Compound (e)

$C_8F_{17}SO_2N(C_3H_7)-CH_2COOK$

Evaluation of Photographic Performance

The resulting samples were exposed to light through an interference filter having a peak at 633 nm and a continuous wedge using a xenon flash lamp (emission time: $10^{-6}$ sec), and processed under the following temperature and time conditions using an automatic processor FG-710NH (manufactured by Fuji Photo Film Co., Ltd.) to carry out sensitometry.

The following developing solution and the following fixing solution were used.

| Developing Solution | |
|---|---|
| Sodium 1,2-Dihydroxybenzene-3,5-disulfonate | 0.5 g |
| Diethylenetriaminepentaacetic Acid | 2.0 g |
| Sodium Carbonate | 5.0 g |
| Boric Acid | 10.0 g |
| Potassium Sulfite | 85.0 g |
| Sodium Bromide | 6.0 g |
| Diethylene Glycol | 40.0 g |
| 5-Methylbenzotriazole | 0.2 g |
| Hydroquinone | 30.0 g |
| 3-Hydroxymethyl-4-methyl-1-phenyl-3-pyrazolidone | 1.6 g |
| 2,3,5,6,7,8-Hexahydro-2-thioxo-4-(1H)-qunazolinone | 0.05 g |
| Sodium 2-Mercaptobenzimidazole-5-sulfonate | 0.3 g |
| Water to make | one liter |

The pH was adjusted with sodium hydroxide to 10.7.

| Fixing Solution | |
|---|---|
| Sodium Thiosulfate (Anhydrous) | 150 g |
| Compound h described below | 0.1 mol |
| Sodium Bisulfate | 30 g |
| Disodium Ethylenediamine-tetraacetate Dehydrate | 25 g |
| Water to make | one liter |

The pH was adjusted with sodium hydroxide to 6.0.

Compound h

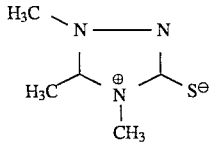

| Processing Stage | | |
|---|---|---|
| Development | 38° C. | 14 sec |
| Fixing | 37° C. | 9.7 sec |
| Rinse | 26° C. | 9 sec |
| Squeeze | | 2.4 sec |
| Drying | 55° C. | 8.3 sec |
| Total | | 43.4 sec |

The reciprocal of the exposure amount providing a density of 3.0 is referred to as the sensitivity. The sensitivity is shown in Tables 1 and 2 below relative to the sensitivity of Photographic Material 4 taken as 100. The incline of the straight line formed by joining the point of a density of 0.1 on the characteristic curve to the point of a density of 3.0 thereon is referred to as the gradation.

TABLE 1

| Photographic Material No. | Polymer in Subbing Layer | Dye in Subbing Layer (Amount) | Amount of Gelatin in Subbing Layer ($mg/m^2$) | Amount of Gelatin per One Side ($g/m^2$) | Sensitivity | Residual Color | Drying Property | Support No. |
|---|---|---|---|---|---|---|---|---|
| 1 (Comp. Ex.) | butadiene-sytrene copolymer latex (butadiene/styrene = 31/69 by weight) | Comparative compound (a) (50 $mg/m^2$) | 160 | 2.4 | 85 | G | G | 1 |
| 2 (Comp. Ex.) | butadiene-sytrene copolymer latex (butadiene/styrene = 31/69 by weight) | I-16 (50 $mg/m^2$) | 600 | " | 100 | B | G | 2 |
| 3 (Comp. Ex.) | butadiene-sytrene copolymer latex | I-16 (50 $mg/m^2$) | 160 | 3.2 | 99 | B | B | 3 |

TABLE 1-continued

| Photographic Material No. | Polymer in Subbing Layer | Dye in Subbing Layer (Amount) | Amount of Gelatin in Subbing Layer ($mg/m^2$) | Amount of Gelatin per One Side ($g/m^2$) | Sensitivity | Residual Color | Drying Property | Support No. |
|---|---|---|---|---|---|---|---|---|
| | (butadiene/styrene = 31/69 by weight) | | | | | | | |
| 4 (Invention) | butadiene-sytrene copolymer latex (butadiene/styrene = 31/69 by weight) | I-16 (50 $mg/m^2$) | " | 2.4 | 100 | G | G | 3 |
| 5 (Invention) | butadiene-sytrene copolymer latex (butadiene/styrene = 31/69 by weight) | I-17 (60 $mg/m^2$) | " | " | 99 | G | G | 4 |
| 6 (Invention) | butadiene-sytrene copolymer latex (butadiene/styrene = 31/69 by weight) | II-8 (60 $mg/m^2$) | " | " | 98 | G | G | 5 |
| | | 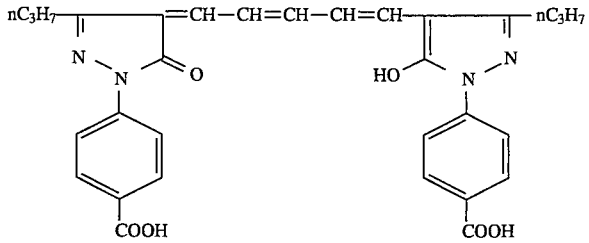 | | | | | | |
| | | Comparative compound (a) | | | | | | |
| 7 (Comp. Ex.) | aqueous polyester WD-SIZE (Eastman Kodak Co.) | I-16 (50 $mg/m^2$) | 80 | 2.4 | 100 | B | G | 6 |
| 8 (Comp. Ex.) | polyacrylic ester Julymer ET410 (Nippon Junyaku KK) | I-16 (50 $mg/m^2$) | " | " | 99 | B | G | 7 |
| 9 (Invention) | vinylidene chloride latex (vinylidene chloride/methacrylic acid/methylacrylate/methylmethacrylate/acrylonitrile = 90/0.3/4/4/1.7 by weight) | I-16 (50 $mg/m^2$) | " | " | 98 | G | G | 8 |

It is clearly seen from the results shown in Table 1 that the photographic materials of the present invention have high sensitivity and exellent rapid-processability.

It is also be seen from the results shown in Table 1 that the photographic materials of the present invention do not suffer from the problem of the residual color.

Evaluation of Drying Property

Films having a size of 24.5×30.5 cm were processed in an automatic processor. The films which left the drying zone of the processor were immediately touched with the hand, and the dry state of the films was examined. The criterion of evaluation is as follows:

The mark G: Dry to touch.

The mark B: The film leaving the drying zone was damp to touch and insufficiently dried.

Evaluation of Residual Color

The evaluation of residual color was made by visually observing Dmin. The results obtained are shown in Table 1 above.

The mark G: Presents no problem for practical use.

The mark B: Not acceptable for practical use.

EXAMPLE 2

Preparation of Supports 9 and 10

A biaxially stretched blue-colored polyethylene terephthalate film of 175 μm in thickness was subjected to corona discharging treatment. The polyethylene terephthalate film contained 1,4-bis(2,6-diethylanilino)anthraquinone. The following hydrophobic polymer layer was coated on the film in such amount as to provide the following coating weights. The coating was carried out using a wire bar coater. The coated film was dried at 175° C. for one minute.

Hydrophobic Polymer Layer

| | |
|---|---|
| Polymer (Compound shown in Table 2 below) | 0.322 $g/m^2$ |
| Sodium Salt of 2,4-Dichloro-6-hydroxy-s-triazine | 8.4 $mg/m^2$ |

The latex solution contained 0.4 wt % of the following emulsifying dispersant (a) based on the amount, on a solid basis, of the latex.

Emulsifying Dispersant (a)

$$\begin{array}{l} nC_6H_{13}OOCCH_2 \\ \quad\quad\quad\quad | \\ nC_6H_{13}OOCCH-SO_3Na \end{array}$$

Subsequently, the following hydrophilic colloid layer was coated thereon in an amount to provide the following coating weight. The coating was carried out using a wire bar coater. The coated film was dried at 150° C. for one minute.

Second Subbing Layer (Hydrophilic Colloid Layer)

| | |
|---|---|
| Gelatin | amount shown in Table 2 below |
| Polyethylene Acrylate | 20 mg/m$^2$ |
| $C_{12}H_{25}O(CH_2CH_2O)_{10}H$ | 4 mg/m$^2$ |
| 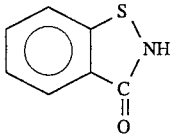 | 0.27 mg/m$^2$ |
| Dye | Compound and amount shown in Table 2 below |

Preparation of Silver Halide Emulsion 34 g of gelatin was dissolved in 850 ml of $H_2O$ in a container. To the container containing the resulting aqueous gelatin solution heated to 65° C., there were added 1.7 g of sodium chloride, 0.1 g of potassium bromide and 70 mg of the following compound (A).

$$HO—(CH_2)_2S—(CH_2)_2—S—(CH_2)_2—OH$$

Subsequently, 500 ml of an aqueous solution containing 170 g of silver nitrate and 500 ml of an aqueous solution containing potassium hexachloroiridate (III) (in such an amount as to give a ratio by mol of iridium to the resulting silver halide of $5\times10^{-7}$), 12 g of sodium chloride and 98 g of potassium bromide were added thereto by means of the double jet process to prepare cubic monodisperse silver chlorobromide grains having a mean grain size of 0.4 μm. After the resulting emulsion was desalted, 50 g of gelatin was added thereto. The pH of the emulsion was adjusted to 6.5, and the pAg thereof was adjusted to 8.1. Subsequently, 2.5 mg of sodium thiosulfate and 5 mg of chloroauric acid were added thereto, and chemical sensitization was carried out at 65° C. Further, 0.2 g of 4-hydroxy-6-methyl- 1,3,3a, 7-tetrazaindene was added thereto, and the emulsion was quenched to solify the same (Emulsion A).

Separately, cubic monodisperse silver chlorobromide grains having a mean grain size of 0.3 μm were prepared in the same manner as Emulsion A, except that the gelatin solution was heated to 40° C. After desalting, 50 g of gelatin was added thereto. The pH of the emulsion was adjusted to 6.5, and the pAg thereof was adjusted to 8.1. Subsequently, 2.5 mg of sodium thiosulfate and 5 mg of chloroauric acid were added thereto, and chemical sensitization was carried out at 65° C. Further, 0.2 g of 4-hydroxy-6-methyl-1,3,3a, 7-tetrazaindene was added thereto, and the emulsion was quenched to solidify the same, thereby obtaining Emulsion B.

Emulsion A and Emulsion B in a ratio of 1:1 by weight were mixed, and the following additives were added to the emulsion mixture to obtain an emulsion coating solution, each amount being per mol of silver halide.

Formulation of Emulsion Coating Solution

| | |
|---|---|
| Spectral Sensitizing Dye (2) | $1.0\times10^{-4}$ mol |
| Supersensitizing Agent (3) | $0.7\times10^{-3}$ mol |
| Preservability Improver (4) | $1\times10^{-3}$ mol |
| Polyacrylamide (Mol. Wt. = 40,000) | 10 g |
| Dextran | 10 g |
| Trimethylol Propane | 1.6 g |
| Polystyrenesulfonic Acid (Na salt) | 1.2 g |
| Latex of poly(ethyl acrylate/ methacrylic acid) | 12 g |
| N,N'-Ethylenebis(vinyl-sulfonacetamide) | 3.0 g |
| 1-Phenyl-5-mercaptotetrazole | 50 mg |
| Stabilizer (9) | 100 mg |

Spectral Sensitizing Dye (2)

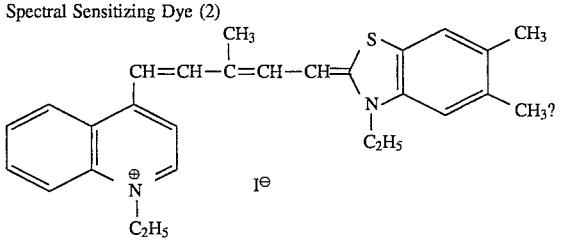

Supersensitizing Agent (3)

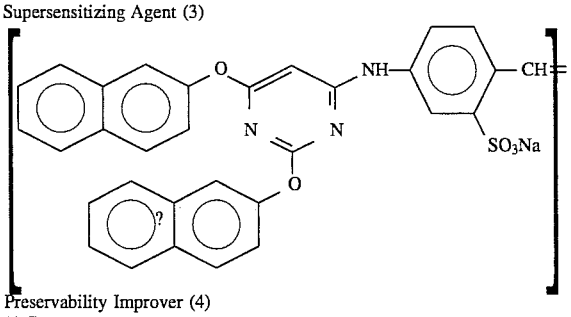

Preservability Improver (4)

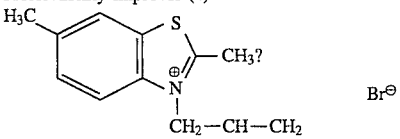

Stabilzer (9)

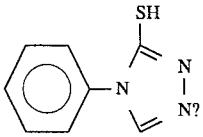

Preparation of Coating Solution for Surface Protective Layer of Emulsion Layer

A container was heated to 40° C. and the following additives were added thereto to prepare the coating solution.

Formulation of Coating Solution for Surface Protective Layer of Emulsion Layer

| | |
|---|---|
| Gelatin | 100 g |
| Polyacrylamide (Mol. Wt. = 40,000) | 12 g |
| Polysodium Styrenesulfonate (Mol. Wt. = 600,000) | 0.6 g |
| N,N'-Ethylenebis(vinyl sulfon- | 2.2 g |

-continued

| Formulation of Coating Solution for Surface Protective Layer of Emulsion Layer | |
|---|---|
| acetamide) | |
| Polymethyl Methacrylate (fine particles having an average particle size of 2.0 μm) | 2.7 g |
| Sodium t-Octylphenoxyethoxy-ethanesulfonate | 1.8 g |
| $C_{16}H_{33}O-(CH_2O)_{10}-H$ | 4.0 g |
| Polysodium Acrylate | 6.0 g |
| $C_8F_{17}SO_3K$ | 70 mg |
| $C_8F_{17}SO_2N(C_3H_7)(CH_2CH_2O)_4(CH_2)_4-SO_3Na$ | 70 mg |
| NaOH (1N) | 6 ml |
| Methanol | 90 ml |
| 1-Phenyl-5-mercaptotetrazole | 80 mg |
| Compound (5) | 0.06 g |

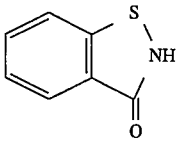

Preparation of Photographic Materials 10 and 11

The above emulsion coating solution and the above coating solution for the surface protective layer were coated on each of Supports 9 and 10 in such amount as to provide a total silver coating weight (as Ag) of 2.3 g/m$^2$ to prepare each of Photographic Materials 10 and Ill. The gelatin coating weight of the emulsion layer was 1.4 g/m$^2$, and the gelatin coating weight of the surface protective layer was 1.0 g/m$^2$.

The sensitivity of each emulsions was measured by the following sensitometry.

Sensitometry

The sensitometry of the thus-prepared Photographic Materials 10 and 11 was carried out in the following manner to measure the sensitivity and the gamma (contrast) value. Photographic Materials 10 and 11 were stored at 25° C. and 60% RH for 7 days after coating, and subjected to scanning exposure at room temperature using a semiconductor laser of 780 nm ("FCR Laser Image Printer type CR-LP414" manufactured by Fuji Photo Film Co., Ltd.). The photographic materials were then processed using an automatic processor FCR (manufactured by Fuji Photo Film Co., Ltd.) under conditions of a development temperature of 35° C., and a Dry to Dry time of 67 seconds. The conveying speed was mm/min. The replenishment rate of the developing solution was 23 ml/m$^2$ of the photographic material, and that of the fixing solution was 23 ml/m$^2$ of the photographic material.

The reciprocal of the exposure amount providing an optical density of the density of the unexposed area + 1.0 is referred to as the sensitivity. The sensitivity is represented relative to the sensitivity of the Photographic Material 11 taken as 100.

The processing solutions had the following compositions.

| Developing Solution | |
|---|---|
| KOH | 57.5 g |
| $Na_2SO_3$ | 87.5 g |
| $K_2SO_3$ | 110 g |
| Diethylenetriaminepentaacetic Acid | 5 g |
| Boric Acid | 25 g |
| $K_2CO_3$ | 32.5 g |
| Hydroquinone | 87.5 g |
| Diethylene Glycol | 125 g |
| 4-Hydroxymethyl-4-methyl-l-phenyl-3-pyrazolidone | 10 g |
| 5-Methylbenzotriazole | 0.15 g |
| 2,3,5,6,7,8-Hexahydro-2-thioxo-4-(1H)-quinazolinone | 0.25 g |
| Sodium 2-Mercaptobenzimidazole-5-sulfonate | 0.35 g |
| KBr | 7.5 g |
| 1-Phenyl-5-mercaptotetrazole | 0.15 g |
| Water to make | one liter |
| **Fixing Solution** | |
| Ammonium Thiosulfate | 145 g |
| Disodium Ethylenediaminetetraacetate Dehydrate | 30 mg |
| $Na_2S_2O_3.5H_2O$ | 15 g |
| Sodium Metabisulfite | 13.3 g |
| NaOH | 12.6 g |
| Acetic Acid (90 wt %) | 30 g |
| KI | 0.5 g |
| Water to make | one liter |

TABLE 2

| Photographic Material No. | Polymer in Subbing Layer | Dye in Subbing Layer (Amount) | Amount of Gelatin in Subbing Layer (mg/m$^2$) | Amount of Gelatin per One Side (g/m$^2$) | Sensitivity | Support No. |
|---|---|---|---|---|---|---|
| 10 (Comp. Ex.) | butadiene-styrene copolymer latex (butadiene/styrene = 31/69 by weight) | Comparative Compound (b) (30 mg/m$^2$) | 160 | 2.4 | 70 | 9 |
| 11 (Invention) | butadiene-styrene copolymer latex (butadiene/styrene = 31/69 by weight) | I-18 (50 mg/m$^2$) | " | " | 100 | 10 |

TABLE 2-continued

| Photographic Material No. | Polymer in Subbing Layer | Dye in Subbing Layer (Amount) | Amount of Gelatin in Subbing Layer ($mg/m^2$) | Amount of Gelatin per One Side ($g/m^2$) | Sensitivity | Support No. |
|---|---|---|---|---|---|---|
| 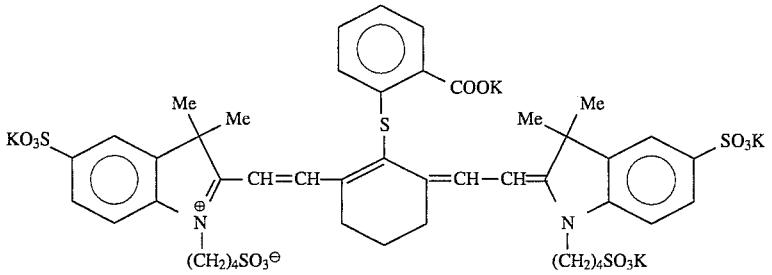 Comparative compound (b) | | | | | | |

It is clearly seen from the results shown in Table 2 that according to the present invention, a photographic material having high sensitivity is obtained.

EXAMPLE 3

Preparation of Support 11

The following subbing layers were provided on the side opposite to that on which the subbing layers were previously coated in preparation of Support 3 of Example 1.

The side on which the subbing layers were previously coated is referred to as the front side, and the side on which the following subbing layers are provided is referred to as the back side.

The following first subbing layer was coated on the back side in such amount as to provide the following coating weights. The coating was carried out using a wire bar coater. The coated support was dried at 185° C. for one minute.

| First Subbing Layer | |
|---|---|
| Butadiene-Styrene Copolymer Latex (butadiene/styrene = 31/69 by weight) | 0.322 $g/m^2$ |
| Sodium Salt of 2,4-Dichloro-6-hydroxy-s-triazine | 8.4 $mg/m^2$ |

The latex solution contained 0.4 wt % of the following emulsifying dispersant (a) based on the amount, on a solid basis, of the latex.

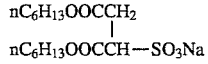

Subsequently, the following second subbing layer was coated on both sides of the support in such amount as to provide the following coating weights. The coating was carried out using a wire bar coater. The coated support was dried at 150° C. for one minute.

| Second Subbing Layer | |
|---|---|
| Gelatin | 80 $mg/m^2$ |
| Polyethyl Acrylate | 20 $mg/m^2$ |
| $C_{12}H_{25}O(CH_2CH_2O)_{10}H$ | 4 $mg/m^2$ |

-continued

| Second Subbing Layer | |
|---|---|
| 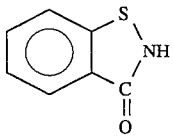 | 0.27 $mg/m^2$ |

Preparation of Photographic Material 12

The following insensitive hydrophilic colloid layer and the following polymer layer were coated (in this order) on the back side of Support 11 in such amount as to provide the following coating weights. The coated support was dried at 50° C. for 5 minutes.

| (1) Insensitive Hydrophilic Colloid Layer | |
|---|---|
| Gelatin | 1.5 $g/m^2$ |
| Polymethyl methacrylate (fine particles having an average particle size of 3 μm) | 50 $mg/m^2$ |
| Sodium Dodecylbenzenesulfonate | 10 $mg/m^2$ |
| Polysodium Styrenesulfonate | 20 $mg/m^2$ |
| N,N'-Ethylenebis(vinylsulfonacetamide) | 30 $mg/m^2$ |
| Ethyl Acrylate Latex (average particle size: 0.1 μm) | 1.0 $g/m^2$ |
| (2) Polymer Layer | |
| Latex of Styrene:Butadiene: Divinylbenzene:Methacrylic Acid = 20:72:6:2 | 1 $g/m^2$ |
| $C_8F_{17}SO_3K$ | 5 $mg/m^2$ |
| Sodium salt of 2,4-Dicholor-6-hydroxy-s-triazine | 5 $mg/m^2$ |

The emulsion layer and the surface protective layer were coated on the front side of Support 11 in the same manner as in preparation of Photographic Material 4 of Example 1.

Evaluation of Drying Property

The evaluation of drying property was made in the same manner as in Example 1.

Evaluation of Curling

The obtained Samples were cut into test pieces of 5 cm (long) by 1 cm (wide), stored at 25° C. and 60% RH for 3 days and then transferred to an atmosphere of 25° C. and 10% RH. After 2 hours, the extent of curling of the test pieces was measured.

The curling value is determined by the following formula.

Curling value=1/(Curvature Radius (cm) of Sample)

When the emulsion side is the inner side, the curling value is given as a positive value, and when the emulsion side is the outer side, the curling value is given as a negative value. A practically acceptable curling value is in the range of from −0.02 to +0.02. The results obtained are shown in Table 3 below.

TABLE 3

| Photographic Material No. | Back Layer | Drying Property | Curling | Support No. |
|---|---|---|---|---|
| 4 (Invention) | omitted | G | 0.1 | 3 |
| 12 (Invention) | provided | G | 0.01 | 11 |

It is clearly seen from the results shown in Table 3 that according to the present invention, curling is effectively balanced by providing the specified back layer without deteriorating the drying property.

It will be understood from the above disclosure that the present invention provides silver halide photographic materials having high sensitivity and good image quality, which photographic materials are well adapted for rapid processing.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising a transparent support having thereon a dye layer comprising a hydrophilic colloid, a hydrophobic polymer layer and at least one light-sensitive silver halide emulsion layer, wherein the dye layer contains at least one dye represented by formulae (I) to (VIII) dispersed in the form of fine solid particles, the dye layer is disposed between the at least one light-sensitive silver halide emulsion layer and the support, the hydrophilic colloid coating weight of the dye layer is 0.5 g/m$^2$ or less, and the hydrophobic polymer layer is disposed between the dye layer and the support:

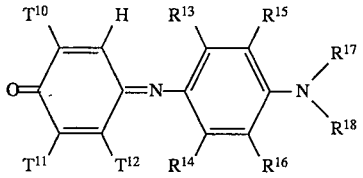

(I)

wherein $T^{10}$, $T^{11}$ and $T^{12}$ independently represent a hydrogen atom, a halogen atom, a cyano group, a nitro group, a carboxyl group, an alkyl group, an aryl group, an alkoxy group, an aryloxy group, an alkylthio group, an arylthio group, an alkylsulfonyl group, an arylsulfonyl group, a sulfamoyl group, a carbamoyl group, an amino group, a sulfonamido group, a carbonamido group, a ureido group, a sulfamido group, a hydroxyl group, a vinyl group or an acyl group; $R^{13}$ and $R^{14}$ independently represent a hydrogen atom, a halogen atom, an alkoxy group, an alkyl group, an alkenyl group, an aryloxy group or an aryl group; $R^{15}$ and $R^{16}$ independently represent a member selected from the group consisting of a hydrogen atom, an alkyl group, an alkoxy group, and a halogen atom; and $R^{17}$ and $R^{18}$ independently represent an alkyl group, an aryl group, a vinyl group, an acyl group or an alkyl- or arylsulfonyl group; or $T^{11}$ and $T^{12}$, $R^{13}$ and $R^{15}$, $R^{14}$ and $R^{16}$, $R^{17}$ and $R^{18}$, $R^{15}$ and $R^{17}$ or $R^{16}$ and $R^{18}$ may be combined together to form a ring;

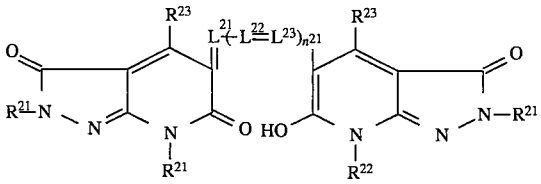

(II)

wherein $R^{21}$ represents a hydrogen atom, an alkyl group, an aryl group or a heterocyclic group; $R^{22}$ represents a hydrogen atom, an alkyl group, an aryl group, a heterocyclic group, $COR^{24}$ or $SO_2R^{24}$; $R^{23}$ represents a hydrogen atom, a cyano group, a hydroxyl group, a carboxyl group, an alkyl group, an aryl group, $COOR^{24}$, $OR^{24}$, $NR^{25}R^{26}$, $CONR^{25}R^{26}$, NR25COR$^{24}$, $NR^{25}SO_2R24$ or $NR^{25}CONR^{25}R^{26}$; $R^{24}$ represents an alkyl group or an aryl group; $R^{25}$ and $R^{26}$ each represents a hydrogen atom, an alkyl group or an aryl group; $L^{21}L$, $^{22}$ and $L^{23}$ each represents a methine group; and $n^{21}$ represents 1 or 2;

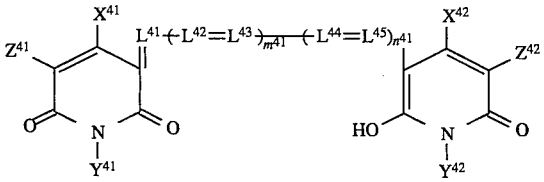

(III)

wherein $X^{41}$ and $X^{42}$ each represents a hydrogen atom, a hydroxyl group, a carboxyl group, —$COOR^{41}$, —$COR^{41}$, —$CONH_2$, —$CONR^{41}R^{42}$, an alkyl group, an aryl group or a heterocyclic group; $Y^{41}$ and $Y^{42}$ each represents a hydrogen atom, an alkyl group, an aryl group or a heterocyclic group; $Z^{41}$ and $Z^{42}$ each represents a hydrogen atom, —CN, a carboxyl group, —$COOR^{43}$, —$COR^{43}$, —$CONH_2$, —$CONR^{43}R^{44}$, —$NHCOR^{43}$, —$NHSO_2R^{43}$, —$SO_2R^{43}$, an alkyl group, an aryl group or a heterocyclic group; $R^{41}$ and $R^{43}$ each represents an alkyl group or an aryl group; $R^{42}$ and R44 each represents a hydrogen atom, an alkyl group or an aryl group; $L^{41}$, $L^{42}$, $L^{43}$, $L^{44}$ and $L^{45}$ each represents a methine group; and $m^{41}$ and $n^{41}$ each represents an integer and the sum of $m^{41}$ and $n^{41}$ is 2;

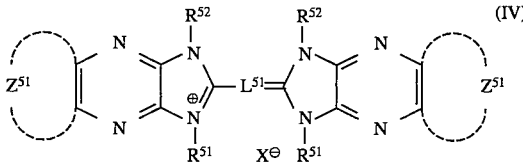

(IV)

wherein $R^{51}$ and $R^{52}$ each represents an alkyl group, an alkenyl group or an aryl group; $L^{51}$ represents a bonding group formed by bonding five or seven methine groups through conjugated double bonds; $Z^{51}$ represents an atomic group required for completing an aromatic ring; and $X^{\ominus}$ represents an anion;

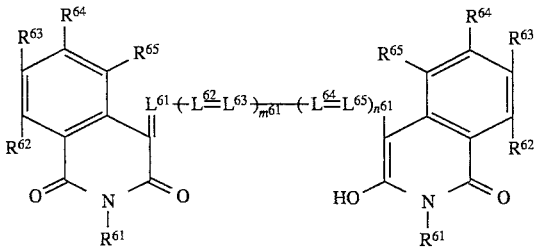

(V)

wherein $R^{61}$ represents a hydrogen atom, an alkyl group or an aryl group; $R^{62}$, $R^{63}$, $R^{64}$ and $R^{65}$ each represents a hydrogen atom, an alkyl group, a halogen atom, an alkoxy group, an alkoxycarbonyl group, a carboxyl group, a hydroxyl group or an amino group; and $L^{61}$, $L^{62}$, $L^{63}$, $L^{64}$ and $L^{65}$ each represents a methine group; and $m^{61}$ amd $n^{61}$ each represents an integer and the sum of $m^{61}$ and $n^{61}$ is 2;

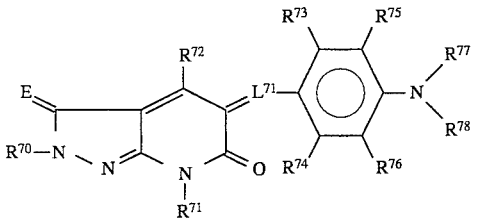

(VI)

wherein $L^{71}$ represents a nitrogen atom or a group formed by bonding five or seven methine groups through conjugated double bonds; E represents O, S or $NR^{79}$; $R^{70}$ and $R^{79}$ independently represent a hydrogen atom, an alkyl group, an alkenyl group, an alkynyl group, an aryl group, a heterocyclic group, an amino group, a hydrazino group or a diazenyl group; $R^{71}$ represents a hydrogen atom, an alkyl group, an aryl group, an alkenyl group, an alkynyl group or a heterocyclic group; $R^{72}$ represents a hydrogen atom, a halogen atom, a cyano group, a nitro group, a hydroxyl group, a carboxyl group, an alkyl group, an aryl group, an alkenyl group, a heterocyclic group, an alkoxy group, an aryloxy group, an alkoxycarbonyl group, an aryloxycarbonyl group, an amino group, an acyloxy group, a carbamoyl group, a sulfamoyl group, an alkylthio group, an arylthio group, an alkylsulfonyl group, an arylsulfonyl group or an alkynyl group; $R^{70}$ and $R^{79}$ may be combined together to form a ring; $R^{73}$ and $R^{74}$ independently represent a hydrogen atom, a halogen atom, an alkoxy group, an alkyl group, an alkenyl group, an aryloxy group or an aryl group; $R^{75}$ and $R^{76}$ independently represent a member selected from the group consisting of a hydrogen atom, an alkyl group, an alkoxy group, and a halogen atom; and $R^{77}$ and $R^{78}$ independently represent an alkyl group, an aryl group, a vinyl group, an acyl group or an alkyl- or arylsulfonyl group; or $R^{73}$ and $R^{75}$, $R^{74}$ and $R^{76}$, $R^{77}$ and $R^{78}$, $R^{75}$ and $R^{77}$ or $R^{76}$ and $R^{78}$ may be combined together to form a ring;

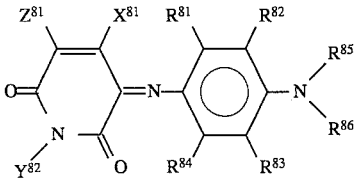

(VII)

wherein $X^{81}$ represents a hydrogen atom, a hydroxyl group, $COOR^{87}$, $CONR^{87}R^{88}$, alkyl group or an aryl group; $Y^{82}$ represents a hydrogen atom, an alkyl group, an aryl group, a heterocyclic group or $NR^{87}R^{88}$; $Z^{81}$ represents a hydrogen atom, an alkyl group, an aryl group, a cyano group, $COOR^{89}$, $CONR^{87}R^{88}$, $COR^{89}$, $SO_2R^{89}$, $NR^{88}COR^{89}$, a nitro group or a pyridyl group; $R^{81}$, $R^{82}$, $R^{83}$ and $R^{84}$ each represents a hydrogen atom, an alkyl group, $OR^{89}$, $NR^{89}COR^{87}$, $COOR^{89}$, $CONR^{87}R^{88}$ or a halogen atom; $R^{85}$ and $R^{86}$ each represents a hydrogen atom, an alkyl group, an aryl group or a heterocyclic group; and $R^{87}$, $R^{88}$ and $R^{89}$ each represents a hydrogen atom, an alkyl group, an aryl group or a heterocyclic group; or $R^{81}$ and $R^{82}$, $R^{85}$ and $R^{86}$, $R^{82}$ and $R^{85}$, $R^{83}$ and $R^{86}$ or $R^{87}$ and $R^{88}$ may be combined together to form a five-membered or six-membered ring;

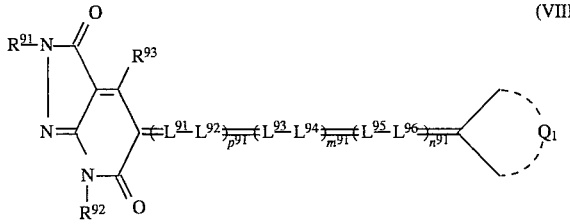

(VIII)

wherein $R^{91}$, $R^{92}$ and $R^{93}$ each represents a hydrogen atom, an alkyl group or an aryl group; $Q_1$ represents an atomic group required for forming a basic heterocyclic ring; $L^{91}$, $L^{92}$, $L^{93}$, $L^{94}$, $L^{95}$ and $L^{96}$ each represents a methine group; and $p^{91}$, $m^{91}$ and $n^{91}$ each represents 0 or 1 and $p^{91}+m^{91[<m]diu1}+n^{91}$ is an integer of at least 2, provided that the compound represented by formula (VIII) has at least one member selected from the group consisting of a carboxyl group, a sulfonic acid arylamido group and a phenolic hydroxyl group contained in the molecular structure thereof.

2. The silver halide photographic material as in claim 1, wherein the total hydrophilic colloid coating weight is 3 $g/m^2$ or less per each side of the support.

3. The silver halide photographic material as in claim 1, wherein the hydrophobic polymer layer comprises a styrene-butadine copolymer or a vinylidene chloride copolymer.

4. The silver halide photographic material as in claim 1, further comprising a light-insensitive hydrophilic colloid layer containing a hydrophilic colloid as a binder provided on a second side of the support opposite the side having thereon at least one silver halide emulsion layer and a hydrophobic polymer layer provided on the second side of the support further away from the support than the light-insensitive hydrophilic colloid layer, and the light-insensitive hydrophilic colloid layer and the hydrophobic polymer layer are substantially not swollen when contacted with a processing solution.

5. The silver halide photographic material as in claim 1, wherein the fine solid particles have a particle size of 1.0 μm or smaller.

6. The silver halide photographic material as in claim 1, wherein the dye represented by formulae (I) to (VIII) is contained in the dye layer in an amount of from 5 to 300 $mg/m^2$.

7. The silver halide photographic material as in claim 1, wherein the hydrophilic colloid coating weight of the dye layer is from 0.05 to 0.3 $g/m^2$.

8. The silver halide photographic material as in claim 1, wherein the support comprises a polyethylene terephthalate film or a cellulose triacetate film.

* * * * *